(12) United States Patent
Sensui

(10) Patent No.: US 8,173,345 B2
(45) Date of Patent: May 8, 2012

(54) TONER AND PROCESS OF PRODUCTION OF THE SAME

(75) Inventor: Keita Sensui, Tokyo (JP)

(73) Assignee: Zeon Corporation, Tokyo (JP)

( * ) Notice: Subject to any disclaimer, the term of this patent is extended or adjusted under 35 U.S.C. 154(b) by 1077 days.

(21) Appl. No.: 11/996,140

(22) PCT Filed: Jul. 13, 2006

(86) PCT No.: PCT/JP2006/313977
§ 371 (c)(1),
(2), (4) Date: Jan. 18, 2008

(87) PCT Pub. No.: WO2007/010828
PCT Pub. Date: Jan. 25, 2007

(65) Prior Publication Data
US 2009/0130578 A1   May 21, 2009

(30) Foreign Application Priority Data

Jul. 19, 2005 (JP) .............................. 2005-209303
Jul. 20, 2005 (JP) .............................. 2005-209770
Sep. 30, 2005 (JP) .............................. 2005-287809

(51) Int. Cl.
*G03G 9/08* (2006.01)
(52) U.S. Cl. ..................................... 430/105; 430/109.1
(58) Field of Classification Search .................. 430/105, 430/109.1
See application file for complete search history.

(56) References Cited

U.S. PATENT DOCUMENTS

| 6,602,937 B2 * | 8/2003 | Hara et al. ........................... 524/5 |
| 2002/0009661 A1 | 1/2002 | Hashimoto et al. |
| 2005/0026062 A1 | 2/2005 | Komoto et al. |
| 2005/0048392 A1 | 3/2005 | Tanaka |
| 2005/0176925 A1 | 8/2005 | Fujino et al. |
| 2006/0040196 A1 * | 2/2006 | Yano et al. .................. 430/109.1 |
| 2008/0182189 A1 * | 7/2008 | Sensui ........................ 430/108.2 |

FOREIGN PATENT DOCUMENTS

| JP | 61-179202 A | 8/1986 |
| JP | 10-020555 A | 1/1998 |
| JP | 1020548 A | 1/1998 |
| JP | 2000-3076 A | 1/2000 |
| JP | 2000-321809 A | 11/2000 |

(Continued)

OTHER PUBLICATIONS

English Translation of JP 2004-333841.*

(Continued)

*Primary Examiner* — Mark F Huff
*Assistant Examiner* — Rashid Alam
(74) *Attorney, Agent, or Firm* — Westerman, Hattori, Daniels & Adrian, LLP

(57) ABSTRACT

[PROBLEMS] To provide a toner superior in shelf stability, not giving off an offensive odor and degrading the surrounding environment when used for printing, and superior in durability at the time of use for continuous printing under high temperature, high humidity conditions.

[MEANS FOR SOLVING PROBLEMS] A process of production of a toner containing colored polymer particles obtained by polymerizing a polymerizable monomer composition containing a polymerizable monomer and colorant in an aqueous medium in the presence of a polymerization initiator, wherein the polymerization initiator is an organic peroxide having a molecular weight of 205 or less, and a purity of 90% or more.

2 Claims, 1 Drawing Sheet

FOREIGN PATENT DOCUMENTS

| | | | |
|---|---|---|---|
| JP | 200181108 A | 3/2001 | |
| JP | 2001-117272 A | 4/2001 | |
| JP | 2001-255697 A | 9/2001 | |
| JP | 2001-255699 A | 9/2001 | |
| JP | 2001255699 A | 9/2001 | |
| JP | 2002251037 A | 9/2002 | |
| JP | 2004271816 A | 9/2004 | |
| JP | 2004-287426 A | 10/2004 | |
| JP | 2004333841 A | * | 11/2004 |
| JP | 200562804 A | 3/2005 | |
| JP | 200570574 A | 3/2005 | |
| WO | 03040196 A1 | 5/2003 | |

OTHER PUBLICATIONS

Chemdraw structure of t-butyl-peroxy acetate, Chemdraw Software program, 1986-2009 Cambridge Soft.*

International Search Report of PCT/JP2006/313977, date of mailing Sep. 19, 2006.

Notification of Reasons for Refusal dated Oct. 18, 2011, issued in corresponding Japanese Patent Application No. 2005-209770 w/translation.

* cited by examiner

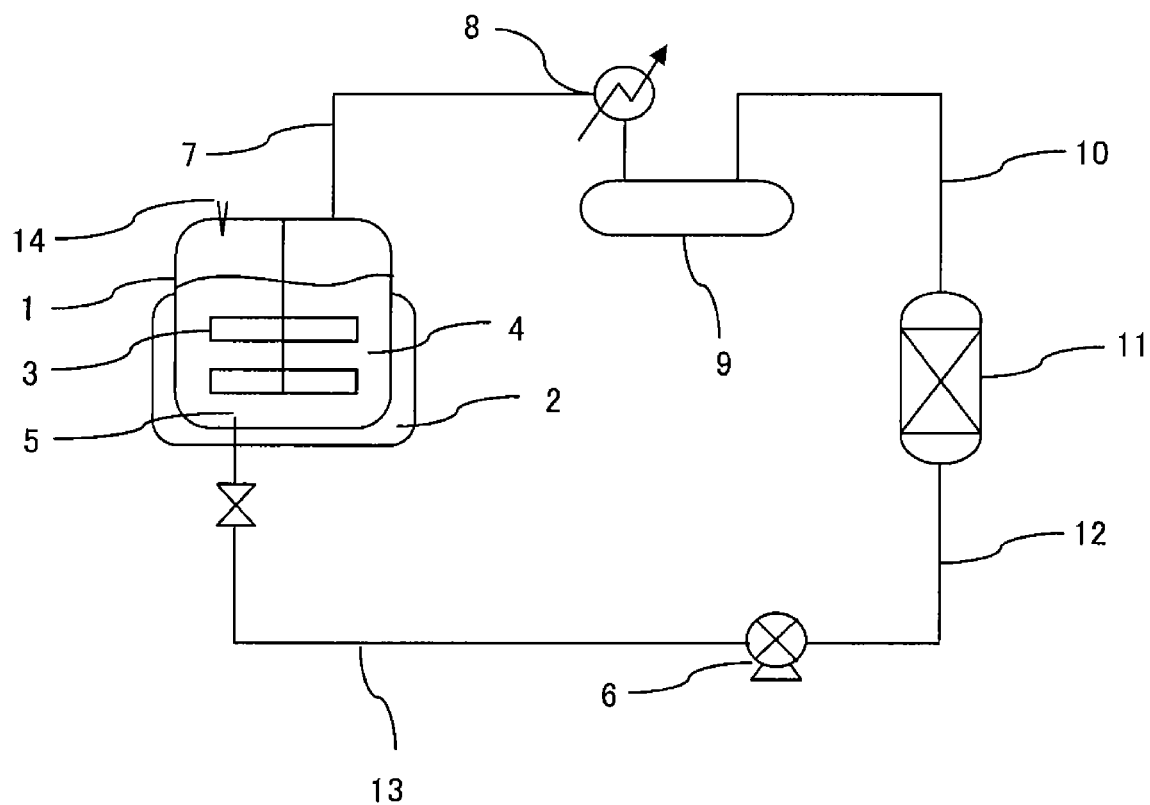

TONER AND PROCESS OF PRODUCTION OF THE SAME

TECHNICAL FIELD

The present invention relates to a toner used for development (developer for electrostatic image development) in a copier, facsimile, printer, or other image forming apparatus using the electrophotographic process and a process of production of that toner.

BACKGROUND ART

In printing using the electrophotographic process, the electrostatic latent image formed on a photoreceptor is developed by a toner to form a toner image (visible image), then the toner image is transferred onto paper or another transfer material. The transferred toner image is heated and pressed by a heat pressure roll to be fixed on the transfer medium.

As the toner, in the past, a toner obtained by the pulverizing method where a binder resin obtained by polymerizing a polymerizable monomer is melt kneaded with a colorant etc., then pulverized and classified (pulverized toner) has generally been used. However, with the pulverizing method, in particular when producing a fine particle size toner, there are the problems of a drop in the yield, consumption of a large amount of energy for the pulverizing, etc. To solve these, a toner obtained by the polymerization method (polymerized toner) has been proposed.

As the process of production of a polymerized toner, there are the suspension polymerization method, emulsion polymerization method, etc. For example, with the suspension polymerization method, first the polymerizable monomer, the colorant, and, in accordance with need, a charge control agent, molecular weight modifier, or other additives are mixed to obtain a polymerizable monomer composition, then this is dispersed in an aqueous medium having a dispersion stabilizer. Next, the aqueous medium in which the polymerizable monomer composition is dispersed is given a high shear by a high speed stirrer etc. to form droplets of the polymerizable monomer composition. After this, these are polymerized in the presence of a polymerization initiator, filtered, washed, and dried to obtain dried colored polymer particles. Further, these colored polymer particles are mixed with a carrier and/or fine inorganic particles or other external additives to obtain a polymerized toner.

However, some of said additives obstruct polymerization. Further, unreacted polymerizable monomer easily remains in the colored polymer particles. Furthermore, in addition to the polymerizable monomer, compounds produced as a byproduct of the polymerization initiator, the molecular weight modifier, and other volatile matter sometimes remain.

A toner with these volatile matter remaining in it easily falls in high temperature shelf stability. If using this toner for printing, the heating at the time of fixing causes the residual low molecular weight components to volatilize resulting in an offensive odor and degrading the surrounding environment in some cases. Further, in the case of continuous printing, in particular continuous printing under a high temperature and high humidity, there is the problem that the durability easily drops.

To deal with this problem, as a method for removing the polymerizable monomer remaining in the toner after polymerization, the process of production of a toner treating a dispersion containing colored polymer particles after suspension polymerization by reduced pressure stripping, then drying it has been proposed. A toner using t-butylperoxy-2-ethylhexanoate (molecular weight 216) as the polymerization initiator is disclosed (Japanese Patent Publication (A) No. 2000-321809). Further, as a method of removing the polymerizable monomer remaining in the toner after polymerization, the process of production treating the toner by reduced pressure stripping under specific agitation conditions has been proposed. A toner using t-butylperoxy-isobutyrate (made by NOF Corporation, product name "Perbutyl IB", molecular weight 160, purity 74%) as the polymerization initiator has also been disclosed (Japanese Patent Publication (A) No. 2001-117272).

However, in these toners, the amount of unreacted polymerizable monomer is reduced and the amount of polymerizable monomer remaining in the toner is reduced, but this cannot be said to be sufficient. Compounds produced as a byproduct of the polymerization initiator etc. remained in large amounts and the obtained toner did not have sufficient durability of printing, in particular durability of printing under a high temperature and high humidity. Further, if excessively treating the toner to remove more of the remaining low molecular weight components, the colored polymer particles agglomerated during the treatment and the obtained toner easily dropped in print durability, so there were limits.

As a method of reducing the amount of decomposed product of the polymerization initiator and residual monomer (polymerizable monomer) remaining in the toner after polymerization, a process of production of a toner resin using as the polymerization initiator at least one substance selected from the group of the aromatic peroxide dicinnamoyl peroxide and C4 to C8 tertiary alkylperoxy cinnamate (the molecular weight of the one with the smallest molecular weight among these being 220) has been proposed (Japanese Patent Publication (A) No. 2000-3076). If using a polymerization initiator according to this method, the polymerizable monomer remaining in the obtained toner, the compounds produced as a byproduct of the polymerization initiator, etc. remain in large amounts. The obtained toner was not sufficient in durability of printing, in particular durability of printing under a high temperature and high humidity.

Further, to deal with the above problem, as toners limiting the volatile matter remaining in the toners, the toners mentioned below have been disclosed. Japanese Patent Publication (A) No. 2004-287426 discloses a toner containing volatile components comprised of carnauba wax and 4 to 60 ppm of ketones obtained by the method of dissolving a binder resin, colorant, carnauba wax, and other components in an organic solvent, emulsifying the solution in an aqueous medium, then distilling off the solvent and causing agglomeration to produce colored particles. Further, Japanese Patent Publication (A) No. 2001-255699 discloses a toner containing a styrene-based binder resin polymerized using an organic peroxide, having a content of carbonic acid derived from the organic peroxides of less than 2,000 ppm, and having a content of styrene of less than 300 ppm.

Further, Japanese Patent Publication (A) No. 2000-321809 discloses a toner having less than 70 ppm of residual polymerizable monomer and having a fluidity of 55% or more.

However, the toners described in these publications are not sufficient in durability of printing, in particular durability of printing under high temperature, high humidity conditions. Further, they had the problems of easy blocking at the time of storage at a high temperature, that is, a drop in the high temperature shelf stability.

DISCLOSURE OF THE INVENTION

Accordingly, an object of the present invention is to provide a toner superior in high temperature shelf stability.

Another object of the present invention is to provide a toner not giving off an offensive odor or degrading the surrounding environment when used for printing. Still another object of the present invention is to provide a toner superior in durability at the time of use for continuous printing under high temperature, high humidity conditions.

1. The inventors engaged in intensive studies on the properties of the polymerization initiators used for production of polymerized toner and as a result discovered that the above objects can be achieved by producing a polymerized toner using as the polymerization initiator an organic peroxide having a molecular weight of 205 or less, having little impurities or diluents, and having a purity of 90% or more.

That is, according to a first aspect of the present invention, there is provided a process of production of a toner containing colored polymer particles obtained by polymerizing a polymerizable monomer composition containing a polymerizable monomer and colorant in an aqueous medium in the presence of a polymerization initiator, wherein said polymerization initiator is an organic peroxide, said organic peroxide has a molecular weight of 205 or less, and said organic peroxide has a purity of 90% or more.

In the process of production of a toner according to the first aspect of the present invention, more preferably said organic peroxide is a peroxyester expressed by the following formula 1:

[Chemical formula 1]

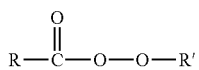

where R and R' indicate any alkyl groups.

In this case, preferably the R in the formula 1 is a C6 or less alkyl group, more preferably the R in the formula 1 is a secondary alkyl group. Further, the one hour half-life temperature of the organic peroxide is preferably 70° C. to 95° C.

2. Further, the inventors engaged in intensive studies on the volatile matter remaining in the toner due to the polymerization method and as a result found that with the toner of the conventional polymerization method, a toner with little residual amount of the main component of the binder resin, that is, the styrene or other polymerizable monomer, in the toner was obtained (see Japanese Patent Publication (A) No. 2001-255699). However, the fact that a large amount of the ether component remained in the toner was found by the studies of the inventors (see Comparative Example 2-1 in this Description). Therefore, the inventors engaged in further intensive studies and as a result discovered that by limiting conditions when polymerizing the droplets of the polymerizable monomer composition in the aqueous medium such as the type and amount added of the polymerization initiator, polymerization temperature, and polymerization time and the method of removal of the volatile matter from the obtained colored polymer particles (stripping) to specific ranges and making the amount of the ether component less than 500 ppm in the obtained toner, the above objects can be achieved.

That is, according to a second aspect of the present invention, there is provided a toner containing colored polymer particles obtained by polymerizing a polymerizable monomer composition containing a polymerizable monomer and colorant in an aqueous medium in the presence of a polymerization initiator, wherein a content of an ether component is less than 500 ppm and said polymerization initiator is an organic peroxide.

In the polymerization toner according to the second aspect of the present invention, said organic peroxide is preferably a nonaromatic organic peroxide, more preferably is a peroxyester. Further, the content of styrene is more preferably less than 50 ppm.

3. Further, according to a third aspect of the present invention, there is provided a process of production of a toner comprising polymerizing a polymerizable monomer composition containing a polymerizable monomer and colorant in an aqueous medium in the presence of an organic peroxide as a polymerization initiator to form colored polymer particles, then providing a stripping step of removing the ether component remaining in said colored polymer particles in said aqueous medium to make the content of the ether component in the obtained electrostatic image development use developer less than 500 ppm. In this case, said stripping step is performed while injecting a gas comprised of air or an inert gas into said aqueous medium containing said colored polymer particles after polymerization.

BRIEF DESCRIPTION OF THE DRAWINGS

FIG. 1 is a view of a system used in the stripping process employed in the examples of the present invention.

BEST MODE FOR CARRYING OUT THE INVENTION

Below, a polymerized toner and a process of production of the same according to an embodiment of the present invention will be explained. First, a polymerizable monomer, colorant, and further, in accordance with need, a charge control agent or other additives are mixed to obtain a polymerizable monomer composition. This polymerizable monomer composition is placed in an aqueous medium, an organic peroxide is added as an polymerization initiator, then droplets are formed, then polymerized to obtain an aqueous dispersion of colored polymer particles. The aqueous dispersion of the colored polymer particles is washed, dewatered, and dried and, in accordance with need, classified, and, further, in accordance with need, given an external additive or/and carrier to obtain a toner.

(1) Polymerizable Monomer Composition

In the present embodiment, a "polymerizable monomer" means a compound able to be polymerized. As the main component of the polymerizable monomer, a monovinyl monomer is preferably used. As the monovinyl monomer, for example, styrene; vinyltoluene, α-methylstyrene, and other styrene derivatives; acrylic acid and methacrylic acid; methyl acrylate, ethyl acrylate, propyl acrylate, butyl acrylate, 2-ethylhexyl acrylate, dimethylaminoethyl acrylate, and other acrylic acid esters; methyl methacrylate, ethyl methacrylate, propyl methacrylate, butyl methacrylate, 2-ethylhexyl methacrylate, dimethylaminoethyl methacrylate, and other methacrylic acid esters; acrylonitrile, methacrylonitrile, and other nitrile compounds; acrylamide, methacrylamide, and other amide compounds; ethylene, propylene, butylene, and other olefins; vinyl chloride, vinylidene chloride, vinyl fluoride, and other vinyl halides and vinylidene halides; vinyl acetate, vinyl propionate, and other vinyl esters; vinyl methyl ether, vinyl ethyl ether, and other vinyl ethers; vinyl methyl ketone, methyl isopropenyl ketone, and other vinyl ketones; 2-vinyl pyridine, 4-vinyl pyridine, N-vinyl pyrrolidone, and other nitrogen-containing vinyl compounds may be mentioned. These monovinyl monomers may be used singly or in any combination thereof. Among these, as the monovinyl monomer, styrene, a styrene derivative, or an acrylic acid or methacrylic acid derivative is preferably used.

The monovinyl monomer is preferably selected so that the polymer obtained by its polymerization has a glass transition temperature (hereinafter referred to as a "Tg") of not more than 80° C. The monovinyl monomer may be used either singly or in any combination thereof to adjust the Tg of the polymer to the desired range.

To improve the hot offset, along with the monovinyl monomer, it is preferable to use any cross-linkable polymerizable monomer. A "cross-linkable polymerizable monomer" means a monomer having at least two polymerizable functional groups. As a cross-linkable polymerizable monomer, for example, divinylbenzene, divinylnaphthalene, their derivatives, and other aromatic divinyl compounds; ethyleneglycol dimethacrylate, diethyleneglycol dimethacrylate, and other ester compounds comprised of alcohols having two or more hydroxyl groups to which two or more carbonic acids are ester bonded; N,N-divinylaniline, divinylether, and other divinyl compounds; compounds having at least three vinyl groups, etc. may be mentioned. These cross-linkable polymerizable monomers may be used either singly or in any combination thereof. In the present invention, the cross-linkable polymerizable monomer is preferably used in a ratio of usually 0.1 to 5 parts by weight, preferably 0.3 to 2 parts by weight, with respect to 100 parts by weight of the monovinyl monomer.

Further, if using a macromonomer as part of the polymerizable monomer, the balance between the high temperature shelf stability and the low temperature fixing ability of the obtained toner becomes good, so this is preferred. A macromonomer is a reactive oligomer or polymer having carbon-carbon unsaturated double bonds able to be polymerized with the ends of the molecular chain and having a number average molecular weight of usually 1,000 to 30,000. A macromonomer preferably gives a polymer having a Tg higher than the Tg of a polymer obtained by polymerization of a monovinyl monomer. The amount of the macromonomer is preferably 0.03 to 5 parts by weight, more preferably 0.05 to 1 part by weight, with respect to 100 parts by weight of the monovinyl monomer.

In the present invention, a colorant is used. When preparing color toners, a black, cyan, yellow, and magenta colorant can be used. As the black colorant, carbon black, titanium black, iron zinc oxide, iron nickel oxide, or another magnetic powder or other pigment may be used.

As the cyan colorant, for example, a copper phthalocyanine compound, its derivative, an anthraquinone compound, etc. may be used. Specifically, C. I. Pigment Blue 2, 3, 6, 15, 15:1, 15:2, 15:3, 15:4, 16, 17:1, 60, etc. may be mentioned.

As the yellow colorant, for example, a monoazo pigment, diazo pigment, or other azo pigment, condensation and polycyclic pigment, or other compound may be used. Specifically, C. I. Pigment Yellow 3, 12, 13, 14, 15, 17, 62, 65, 73, 74, 83, 93, 97, 120, 138, 155, 180, 181, 185, 186, etc. may be mentioned.

As the magenta colorant, for example, a monoazo pigment, diazo pigment, or other azo pigment, condensation and polycyclic pigment, or other compound is used. Specifically, C. I. Pigment Red 31, 48, 57:1, 58, 60, 63, 64, 68, 81, 83, 87, 88, 89, 90, 112, 114, 122, 123, 144, 146, 149, 150, 163, 170, 184, 185, 187, 202, 206, 207, 209, 251, and C. I. Pigment Violet 19 etc. may be mentioned.

The amount of the addition of the colorant is preferably 1 to 10 parts by weight with respect to 100 parts by weight of the monovinyl monomer.

As another additive, a charge control agent may be used. Various positive charging or negative charging ability charge control agents are used. Metal complexes of organic compounds having carboxyl groups or nitrogen-containing groups, metal-containing dyes, and nigrosine and other non-resin charge control agents; copolymers containing quaternary ammonium groups or quaternary ammonium salt groups, copolymers containing sulfonic acid groups or sulfonic acid salt groups, copolymers containing carbonic acid groups or carbonic acid salt groups, and other charge control resins; etc. may be used. Due to the good print durability of the toner, the charge control agent preferably includes a charge control resin. Among the charge control agents, a nonresin charge control agent and a charge control resin may be used together or a charge control resin may be used alone. Using a charge control resin alone is more preferable. As the charge control resin, use of a copolymer containing a quaternary ammonium group or a quaternary ammonium salt group or a copolymer containing a sulfonic acid group or a sulfonic acid salt group is more preferable. The charge control agent is used in an amount of normally 0.01 to 10 parts by weight, preferably 0.03 to 8 parts by weight, with respect to 100 parts by weight of the monovinyl monomer.

As other additives, a molecular weight modifier is preferably used. As the molecular weight modifier, t-dodecyl mercaptan, n-dodecyl mercaptan, n-octyl mercaptan, and 2,2,4,6,6-pentamethyl heptane-4-thiol, and other mercaptan compounds; tetramethylthiuram monosulfide, tetramethylthiuram disulfide, tetraethylthiuram disulfide, tetrabutylthiuram disulfide, dipentamethylene thiuram tetrasulfide, N,N'-dimethyl-N,N'-diphenylthiuram disulfide, N,N'-dioctadecyl-N,N'-diisopropylthiuram disulfide, and other thiuram compounds; piperidine pentamethylene dithiocarbamate, pipecolin picocholyl dithiocarbamate, sodium dimethyldithiocarbamate, sodium diethyl dithiocarbamate, sodium dibutyl dithiocarbamate, zinc dimethyl dithiocarbamate, zinc diethyl dithiocarbamate, zinc dibutyl dithiocarbamate, zinc N-ethyl-N-phenyl dithiocarbamate, tellurium diethyl dithiocarbamate, and other dithiocarbamate compounds may be mentioned. Among these molecular weight modifiers, mercaptan compounds and thiuram compounds are preferable.

The amount of addition of said molecular weight modifier is preferably 0.05 to 10 parts of the polymerizable monomer, preferably 0.1 to 5 parts, more preferably 0.2 to 3 parts, with respect to 100 parts by weight of the monovinyl monomer. The molecular weight modifier is added before the start of polymerization or during the polymerization.

Further, as another additive, a parting agent is preferably added to improve the release of the toner from the fixing roll at the time of fixing. As the parting agent, any agent may be used without particular limitation if generally used as a toner parting agent. For example, a low molecular weight polyolefin wax or its modified wax, johoba wax and other plant-based natural waxes; paraffin and other petroleum waxes; ozokerite, and other mineral waxes; Fischer-Tropsch wax and other synthetic waxes; dipentaerythritol esters and other polyhydric alcohol ester; etc. may be mentioned. Among these, polyhydric alcohol ester is preferable in a balance between high temperature shelf stability and low temperature fixing ability of the toner. These may be used either singly or in any combination thereof. The parting agent is used in an amount of preferably 0.1 to 30 parts by weight, more preferably 1 to 20 parts by weight, with respect to 100 parts by weight of the monovinyl monomer.

(2) Polymerization Initiator

In this embodiment, the above obtained polymerizable monomer composition is dispersed in the aqueous medium including the dispersion stabilizer, the polymerization initiator is added, then the polymerizable monomer composition is formed into droplets. The method of formation of the droplets is not particularly limited, but for example may use an in-line type emulsion disperser (made by Ebara Corporation, product name "Milder™"), a high speed emulsion disperser (made by Tokushu Kika Kogyo, product name "T.K. Homomixer™ MARK II"), or other device enabling strong stirring.

By using as the polymerization initiator an organic peroxide, preferably by using a peroxyester, the polymerizable monomer is efficiently polymerized, so the content of the main component styrene of the polymerizable monomer becomes smaller. In particular, by using as the polymerization initiator an organic peroxide satisfying the specific conditions of a molecular weight of 205 or less and a purity of 90% or more, it is believed that the amounts of unreacted polymerizable monomer remaining in the obtained toner, the compounds produced as a byproduct of the polymerization initiator, and the diluents and other additives included in the polymerization initiator will become smaller.

In polymerization using an organic peroxide, for example, in the case of a peroxyester, if the peroxyester decomposes due to heat, it first breaks down into the corresponding alcohol radicals and carbonic acid radicals, then these radicals and the alkyl radicals produced by the removal of the carbonic acid from the carbonic acid radicals etc. are added to the monomer, whereby the polymerization reaction progresses. However, these radicals sometimes produce various ether components and other byproduct compounds by rebonding or stripping of hydrogen.

On the other hand, even among the organic peroxides, with organic peroxides with a high risk of ignition due to impact or heating, addition of a diluent is required. When using such an organic peroxide as a polymerization initiator, the presence of the diluent easily causes an increase in the volatile matter remaining in the obtained colored polymer particles. Further, when using an organic peroxide containing a large amount of organic peroxides different from the main component organic peroxide as impurities as a polymerization initiator, the impurity organic peroxides cause a drop in the initiator efficiency since they differ from the main component organic peroxide in best reaction conditions and lead to an increase in the polymerizable monomer and ether components remaining in the obtained colored polymer particles.

Among the organic peroxides, peroxyesters are preferable since they are good in initiator efficiency and reduce the amount of residual polymerizable monomer as well. Nonaromatic peroxyesters, that is, peroxyesters with no aromatic rings, are more preferable. Further, the organic peroxide is more preferably a peroxyester of the following formula 1.

[Chemical formula 1]

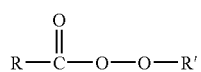

where R and R' indicate any alkyl groups.

The R in formula 1 is preferably a C6 or less alkyl group. C5 or less is more preferable. An isopropyl, 1-methylpropyl, 1-ethylpropyl, 1-methylbutyl, 2-methylbutyl, 3-methylbutyl, 1-ethylpropyl, or other secondary alkyl group is more preferable. 1-methylpropyl and 1-ethylpropyl are particularly preferable. Further, in the formula, R' is preferably a C8 or less alkyl group, t-butyl and t-hexyl are more preferable and t-butyl is particularly preferable. As specific examples of the peroxyester of formula 1, t-hexylperoxy pivalate (t-hexylperoxy-2,2-dimethyl-acetate), t-butylperoxy-2-ethylbutanoate, t-butylperoxy-2-methylbutanoate, etc. may be mentioned.

In the present embodiment, the molecular weight of the main component organic peroxide is preferably 170 to 200, more preferably 175 to 195. Further, in the present embodiment, the purity of the organic peroxide, expressed by the wt % of the main component organic peroxide with respect to that organic peroxide, is preferably 92% or more, more preferably 95% or more.

The one hour half-life temperature of the organic peroxide is preferably 70° C. to 95° C., more preferably 75° C. to 95° C., still more preferably 85° C. to 95° C., since a toner with a good print durability is obtained. Here, the "half-life temperature" is an indicator showing the ease of cleaving of the polymerization initiator. It shows the temperature where when holding the polymerization initiator at that temperature, the initiator breaks down and becomes half the original amount after a certain time. For example, the one hour half-life temperature is the half-life temperature where this certain time is one hour.

The polymerization initiator, as explained above, may be added after the polymerizable monomer composition is dispersed in the aqueous medium and before the formation of the droplets, but may also be added to the polymerizable monomer composition before dispersion in the aqueous medium.

By using the above polymerization initiator, it is possible to reduce the unreacted polymerizable monomer, the ether components produced as a byproduct of the polymerization initiator, etc. remaining in the obtained colored polymer particles. As a result, it is possible to obtain a toner achieving the objects of the present invention, that is, superior in high temperature shelf stability of the toner, not giving off an offensive odor and degrading the surrounding environment when used for printing, and further superior in durability when used for continuous printing under high temperature, high humidity conditions.

The amount of addition of the polymerization initiator used for the polymerization of the polymerizable monomer composition is preferably 0.1 to 20 parts by weight, more preferably 0.1 to 15 parts by weight, more preferably 0.3 to 15 parts by weight, more preferably 0.5 to 10 parts by weight, more preferably 1 to 10 parts by weight, and most preferably 2 to 5.5 parts by weight, with respect to 100 parts by weight of the monovinyl monomer.

In the present embodiment, an aqueous medium means a medium having water as its main component. Further, in the present embodiment, the aqueous medium preferably contains a dispersion stabilizer. As the dispersion stabilizer, for example, barium sulfate, calcium sulfate, and other sulfates; barium carbonate, calcium carbonate, magnesium carbonate, and other carbonates; calcium phosphate and other phosphates; aluminum oxide, titanium oxide, and other metal oxides; aluminum hydroxide, magnesium hydroxide, and ferric hydroxide, and other metal hydroxides; and other inorganic compounds, polyvinyl alcohol, methyl cellulose, gelatin, and other water soluble polymers; anionic surfactants; nonionic surfactants; amphoteric surfactants; and other organic compounds may be mentioned. Said dispersion stabilizer may be used alone or in any combination of two or more types.

Among said dispersion stabilizers, inorganic compounds, in particular colloids of metal hydroxides difficult to dissolve in water are preferable. Because the distribution of particle size of the colored polymer particles can be narrowed, the residual amount of the dispersion stabilizer after washing is small, the obtained toner can clearly reproduce images, and it does not degrade the environmental stability.

(3) Colored Polymer Particles

In the above way, the droplets are formed, the obtained aqueous medium is heated, and the droplets are polymerized in the presence of a polymerization initiator so as to form colored polymer particles. The polymerization temperature of the polymerizable monomer composition is preferably 50° C. or more, more preferably 60 to 95° C. Further, the reaction time of the polymerization is preferably 1 to 20 hours, more preferably 2 to 15 hours.

The colored polymer particles may be used as a toner as they are or with an external additive added, but making them so-called core-shell type colored polymer particles having these colored polymer particles as core layers and having at their outsides shell layers different from the core layers is preferable. Core-shell type colored polymer particles cover the core layers made of the low softening point substances with substances having higher softening points as to obtain a balance between the lowering of the fixing temperature and prevent of agglomeration at the time of storage.

The method of producing the core-shell type colored polymer particles using the colored polymer particles is not particularly limited. They may be produced by conventional known methods. The in-situ polymerization method or phase separation method is preferable from the viewpoint of production efficiency.

The method of production of core-shell type colored polymer particles by the in-situ polymerization method will be explained below. The polymerizable monomer for forming the shell layer (shell polymerizable monomer) and a polymerization initiator may be added to an aqueous medium in which the colored polymer particles are dispersed and then polymerized to obtain core-shell type colored polymer particles.

As the shell polymerizable monomer, ones similar to the above-mentioned polymerizable monomers may be used. Among these, styrene, acrylonitrile, methyl methacrylate, and other monomers giving polymers with Tg's over 80° C. are preferably used alone or in combinations of two or more types.

As the polymerization initiator used for the polymerization of the shell polymerizable monomer, potassium persulfate, and ammonium persulfate, and other persulfate metal salts; 2,2'-azobis(2-methyl-N-(2-hydroxyethyl) propionamide), 2,2'-azobis-(2-methyl-N-(1,1-bis(hydroxymethyl) 2-hydroxyethyl)propionamide), and other azo-based polymerization initiators; and other water-soluble polymerization initiators may be mentioned. Azo-based polymerization initiators are preferable from the viewpoint of the environmental stability of the toner obtained. The amount of the polymerization initiator is preferably 0.1 to 30 parts by weight, more preferably 1 to 20 parts by weight, with respect to 100 parts by weight of the shell polymerizable monomer.

The polymerization temperature of the shell layer is preferably 50° C. or more, more preferably 60 to 95° C. Further, the reaction time of the polymerization is preferably 1 to 20 hours, more preferably 2 to 15 hours.

As explained above, the aqueous dispersion of the colored polymer particles or core-shell type colored polymer particles is obtained by a polymerization process. Note that below, "colored polymer particle" includes both core-shell types and other types. The aqueous dispersion of the obtained colored polymer particles is washed to remove the dispersion stabilizer, filtered, dewatered, and dried in accordance with ordinary methods. Said filtering and dewatering are preferably repeated a number of times in accordance with need.

As the method of washing, when using an inorganic compound as a dispersion stabilizer, preferably an acid or alkali is added to the aqueous dispersion of the colored polymer particles to dissolve the dispersion stabilizer in water and remove it. When using a water-insoluble inorganic hydroxide colloid as a dispersion stabilizer, preferably an acid is added to adjust the pH of the aqueous dispersion of the colored polymer particles to 6.5 or less. As the added acid, sulfuric acid, hydrochloric acid, nitric acid, and other inorganic acids and formic acid, acetic acid, and other organic acids may be used, but from the viewpoint of the large removal efficiency and small load on the production facilities, sulfuric acid is particularly suitable.

For the method of dewatering and filtration, various known methods etc. may be used. It is not particularly limited. For example, the centrifugal filtration method, vacuum filtration method, pressurized filtration method, etc. may be mentioned. Further, the drying method is not particularly limited. Various methods may be used.

The physical properties of the colored polymer particles forming the toner of the present embodiment will be explained next.

The colored polymer particles preferably have a volume average particle size Dv of 3 to 15 μm, more preferably 4 to 12 μm. If the Dv is less than these ranges, the toner fluidity falls, the transferability becomes poorer, blur occurs, and the print density sometimes drops. If over these ranges, the resolution of the image sometimes drops. Further, the colored polymer particles preferably have a ratio Dv/Dp of the volume average particle size Dv and number average particle size Dp of 1.0 to 1.3, more preferably 1.0 to 1.2. If Dv/Dp is over these ranges, blur occurs or the transferability, image density, and resolution sometimes fall.

Further, the colored polymer particles used preferably have a sphericity Sc/Sr of 1.0 to 1.3. Use of ones having a sphericity Sc/Sr of 1.0 to 1.2 is more preferable. If the sphericity Sc/Sr is outside these ranges, the transferability falls, the fluidity of the toner falls, and blur easily occurs. The sphericity Sc/Sr of colored polymer particles is found as follows: The colored polymer particles are photographed by an electron microscope, then the obtained photograph is measured by an image processing analyzer (made by Nireco, product name: Luzex IID) under conditions of an area ratio of particles with respect to the frame area of a maximum 2% and a total number of processing operations of 100. The sphericities Sc/Sr of the 100 colored polymer particles obtained were averaged.

$$\text{Sphericity} = Sc/Sr$$

Sc: Area of circle having absolute maximum length of colored polymer particles as diameter Sr: Real projected area of colored polymer particles

(4) Stripping Process

To adjust the content of the ether component in the toner to the range prescribed in the present application, the obtained aqueous dispersion of colored polymer particles is preferably stripped. Here, "stripping" means treatment to remove the residual volatile matter from the colored polymer particles in the state of the colored polymer particles dispersed in the aqueous medium (that is, in the state of the aqueous dispersion of the colored polymer particles).

When performing the stripping, from the viewpoint of preventing agglomeration of the colored polymer particles, it is preferable to further add a dispersion stabilizer. One of the same type as the dispersion stabilizer used for forming the colored polymer particles is preferable.

As the stripping, the method of blowing saturated steam into an aqueous dispersion of colored polymer particles, the method of reducing the pressure of the aqueous dispersion of colored polymer particles, and the method of blowing a gas into the aqueous dispersion of the colored polymer particles may be mentioned, but the method of blowing a gas into the aqueous dispersion of the colored polymer particles is particularly preferable. Other methods may also be used concurrently.

When using the method of blowing in a gas, as the gas, nitrogen, carbon dioxide, and other inert gases and air may be mentioned. Nitrogen is preferable. The gas may be blown into the vapor phase part of the evaporator (on surface of dispersion of colored polymer particles), but preferably is blown into the dispersion of the colored polymer particles.

If performing stripping, bubbles easily form on the surface of the aqueous dispersion of the colored polymer particles. If these bubbles due to the bubbling become excessive and overflow from the evaporator, the problem will arise of their entering and contaminating the gas circulating line (see reference numeral 7 in FIG. 1).

To suppress bubbling, it is preferable to add at least one type of non-silicone defoamer selected from the group comprised of an oil/fat defoamer, mineral oil defoamer, polyether defoamer, polyalkyleneglycol type nonionic surfactant, emulsion containing an oil/fat and polyalkyleneglycol type nonionic surfactant, and emulsion containing a mineral oil and a polyalkyleneglycol type nonionic surfactant to the aqueous dispersion of the colored polymer particles. Among these non-silicone defoamers, from the viewpoint of the defoam effect and the toner properties, a mineral oil defoamer, polyalkyleneglycol type nonionic surfactant, and emulsion containing an oil/fat and polyalkyleneglycol type anionic surfactant is preferable.

A mineral oil defoamer is a modified hydrocarbon oil having a mineral oil as a base. As a commercially available product, for example, product name "Defoamer DF714S" made by Japan PCM etc. may be mentioned. A polyalkyleneglycol type anionic surfactant is a nonionic surfactant comprised of a polyethyleneglycol type anionic surfactant or polyoxyethylene-polyoxypropylene block copolymer. As a commercially available product, for example, product name "SN Defoamer-180" (defoamer comprised of polyoxyalkylene type nonionic surfactant) made by San Nopco Ltd. may be mentioned. An emulsion of an oil/fat and polyalkyleneglycol type nonionic surfactant is an oil/fat emulsified by a polyalkyleneglycol type nonionic surfactant. As a commercially available product, for example, product name "SN Defoamer™-1407K" (defoamer comprised of emulsion of oil/fat, polyethyleneglycol type nonionic surfactant, etc.) made by San Nopco Ltd. etc. may be mentioned. As a polyether defoamer, product name "Adekanol™ LG-51", "Adekanol™ LG-109", and other polyether type surfactants made by Asahi Denka and product name "IP Defoamer™ U-510" and other special polyether compounds etc. made by NOF Corporation may be mentioned.

The amount used of the non-silicone defoamer or other defoamer is preferably 0.01 to 1 part by weight, more preferably 0.05 to 0.5 part by weight, further preferably 0.07 to 0.3 part by weight, with respect to 100 parts by weight of the polymerizable monomer composition. If the amount used of the defoamer is too small, a sufficient defoam effect is sometimes hard to obtain, while if too great, the obtained toner easily declines in environmental properties, in particular durability and other print properties in a high temperature, high humidity environment.

The stripping time may be suitably determined according to the size of the treatment facility, the amounts of the styrene, ether component, and other volatile matter remaining in the colored polymer particles right after polymerization, etc. but is preferably 0.5 to 40 hours, more preferably 1 to 20 hours, more preferably 2 to 12 hours, particularly preferably 3 to 8 hours. If shorter than the above range, the volatile matter sometimes cannot be sufficiently and efficiently removed, while if longer than the above range, the obtained toner easily drops in durability, in particular durability under a high temperature and high humidity.

The system used for the stripping in the examples in the present invention will be explained. This system, as shown in FIG. 1, is provided outside it with a gas circulating line. This gas circulating line has a blower 6, volatile matter removing apparatus 11, condenser 8, and condensation tank 9. The evaporator 1 may be common with or different from the vessel (reactor) used in the polymerization step. The evaporator 1 is provided with stirring blades 3 for stirring the aqueous dispersion 4 of the colored polymer particles inside it. Further, the evaporator 1 may be provided with a jacket 2 at its outside for heating or cooling in the polymerization stage and for heating in the stripping.

The temperature of the stripping is preferably the glass transition temperature Tg of the binder resin forming the colored polymer particles to less than Tg+75° C., more preferably Tg+10° C. to less than Tg+65° C., more preferably Tg+20° C. to less than Tg+65° C., particularly preferably Tg+25° C. to less than Tg+50° C. By making the temperature of the stripping temperature that range, it is possible to efficiently remove the styrene and other polymerizable monomer or ether component in the colored polymer particles without causing a drop in the durability of the obtained toner, in particular the durability at a high temperature and high humidity. Note that said Tg is calculated from the composition of the monovinyl monomer forming the main component of the binder resin forming the colored polymer particles.

The nitrogen gas or other gas is blown from a gas source (not shown) by a blower 6 through a gas blowing pipe 5 to the inside of the evaporator 1. While stirring, the temperature inside the evaporator 1 is raised to a predetermined temperature, then the gas from the blower 6 is blown from the opening of the blowing pipe 5 into the evaporator 1. Part of the aqueous medium 4 of the colored polymer particles, the residual monomer, and the residual VOC are led through the gas circulating line 7 into the condenser 8, then are led to the condensation tank 9. The water and other liquid components condensed and liquefied in the condensation tank 9 are recovered there (recovery line not shown). The gas component is led through the gas circulating line 10 to the volatile matter removing apparatus 11. The volatile matter removing apparatus 11 is for example an adsorption tower packed with activated charcoal or a bubbling apparatus filled with cold water. The styrene or ether components and other volatile matter are removed there. After this, the nitrogen gas or other gas component can be recirculated from the gas circulating line 12 through the blower 6 and the gas circulating line 13 for reuse.

(5) Toner

In the present embodiment, the colored polymer particles may also be used as is for development of electronic photographs, but the toner may also be adjusted in chargeability, fluidity, high temperature shelf stability, etc. by using a Henschel mixer or other high speed stirrer to mix in colored polymer particles, an external additive, and in accordance with need other particles to obtain a single-component toner. Further, in addition to colored polymer particles, an external additive, and in accordance with need other particles, various known methods may be used to mix in ferrite, iron powder, and other carrier particles to obtain a two-component toner. When applying the technology of the present invention, the effect of the present invention is manifested more, so making the toner a nonmagnetic toner is preferable and making it a nonmagnetic single component toner is more preferable.

As the external additive, inorganic particles or organic resin particles usually used for the purpose of improving the fluidity and chargeability may be mentioned. For example, as inorganic particles, silica, aluminum oxide, titanium oxide, zinc oxide, tin oxide, calcium carbonate, calcium phosphate, cerium oxide, etc. may be mentioned, while as organic resin particles, methacrylic acid ester polymers, acrylic acid ester polymers, styrene-methacrylic acid ester copolymers, styrene-acrylic acid ester copolymers, melamine resin, core-shell type particles with cores of a styrene polymer and shells of a methacrylic acid ester polymer, etc. may be mentioned. Among these, silica or titanium oxide is suitable. Such surface hydrophobized particles are preferable and hydrophobized silica is more preferable. Combined use of two or more types of hydrophobized silica is more preferable. The amount of the external additive added is not particularly limited, but is usually 0.1 to 6 parts by weight with respect to 100 parts by weight of the colored polymer particles.

(6) Contents of Styrene and Ether Component

The toner of the present embodiment is characterized by containing colored polymer particles obtained by polymerizing a polymerizable monomer composition containing the above-mentioned polymerizable monomer and colorant in an aqueous medium in the presence of a polymerization initiator comprised of an organic peroxide and in that the content of the ether component is less than 500 ppm. The ether component in the present embodiment means the component of the monoether with only one ether bond in a molecule. Polyethers having a plurality of ether bonds in a molecule are not included. As the polyether component remaining in the toner, the ether formed by the decomposition of the organic peroxide used as the polymerization initiator, that is, the organic peroxide-derived ether, is the main component.

In the present embodiment, the content of the ether component in the toner is preferably 400 ppm or less, more preferably 200 ppm or less, more preferably 100 ppm or less, particularly preferably 50 ppm or less, most preferably 30 ppm or less. In the present embodiment, by making the ether component derived from the organic peroxide in the toner an extremely small range in the above way, a toner is obtained which is superior in high temperature shelf stability at a high temperature of 60° C., has a good durability of print, in particular durability at a high temperature, high humidity environment, and gives off little offensive odor at the time of fixing.

Further, since a toner superior in shelf stability and giving off little offensive odor at the time of fixing is obtained, the content of the styrene in the toner is preferably less than 50 ppm, more preferably less than 30 ppm, still more preferably less than 20 ppm.

The content of the ether component is assayed according to the present embodiment by using gas chromatography. A specific example is given below.

3 g of the toner was precisely weighed down to 1 mg units. To the 3 g of the toner, 27 g of ethyl acetate was added. The mixture was stirred for 15 minutes, then 13 g of methanol was added and the mixture was stirred a further 10 minutes. The thus obtained solution was allowed to stand to cause the insolubles to precipitate. The supernatant of this solution was sampled as a measurement sample. 2 μl was injected into a gas chromatograph to assay the styrene and ether components.

The measurement conditions by the gas chromatograph were as follows:

Column=product name: DB-5, made by Agilent, 0.25 mm×30 m

Column temperature=Held at 40° C. for 3 minutes, then raised to 130° C. at 10° C./min, then after reaching 130° C., raised at 20° C./min to 230° C.

Injection temperature=200° C.

FID detection side temperature=250° C.

Standard sample for assay: Ethyl acetate/methanol solution of different components

EXAMPLES

The process of production of the present invention will be explained in further detail by examples. Note that the parts and % are based on weight unless particularly indicated to the contrary.

1. Example 1

The test methods used in Example 1 were as follows:

(1) Particle Size

The volume average particle size Dv and the particle size distribution, that is, the ratio Dv/Dp of the volume average particle size and number average particle size Dp, were measured by a particle size measuring device (made by Beckman-Coulter, product name: Multisizer™). The measurement by this Multisizer™ was performed under conditions of an aperture size: 100 μm, medium: Isotone II, and number of measured particles: 100,000.

(2) Average Circularity of Toner

A container was filled in advance with 10 ml of ion exchanged water. To this, 0.02 g of a surfactant serving as a dispersant (alkylbenzene sulfonic acid) was added. Further, 0.02 g of colored polymer particles was added, then the mixture was dispersed by an ultrasonic disperser at 60 W for 3 minutes. The concentration of colored polymer particles was adjusted to 3,000 to 10,000/μl at the time of measurement. 1000 to 10,000 colored polymer particles having a circle equivalent diameter of 1 μm or more were measured using a flow type particle image analysis apparatus (made by Sysmex, product name: FPIA-2100). The average circularity was found from the measured values. The circularity is shown by the following equation. The average circularity is the average of the same.

(Circularity)=(circumferential length of circle equal to projected area of particle)/(circumferential length of projected image of particle)

(3) Evaluation of Shelf Stability 20 g of the toner was placed in a container. The container was sealed, then the container was immersed in a constant temperature water tank with a temperature of 55° C. After 8 hours, it was taken out. The toner was transferred from the removed container to a 42 mesh sieve in a manner preventing vibration as much as possible, then was set in a powder measurement apparatus (made by Hosokawa Micron, model name: PowderTester™). The sieve was set to an amplitude of 1.0 mm and vibrated for 30 seconds, then the weight of the toner remaining on the sieve was measured. This was used as the weight of the agglomerated toner. The shelf stability of the toner (wt %) was calculated from the ratio of the weight of the agglomerated toner and the weight of the measured toner. The smaller the value of the shelf stability of a toner (wt %), the less agglomerated toner and the better the shelf stability indicated.

Evaluation A . . . Less than 1%

Evaluation B . . . 1% to less than 5%

Evaluation C . . . 5% or more (4) Odor Evaluation

For the evaluation of the odor of the polymerized toner, 10 persons were randomly selected as monitors and asked to evaluate the odor of the printer exhaust part at the time of printing 1000 sheets in the following print durability test (NN environment fogging):

Evaluation A . . . Nine out of 10 or more did not notice any odor.

Evaluation B . . . Seven out of 10 or more noticed some odor, but felt it was not unpleasant.

Evaluation C . . . Five out of 10 or more felt the odor was unpleasant.

(5) Print Durability Test (Number of Sheets After Which Fogging Occurred in NN Environment and Number of Sheets After Which Fogging Occurred in HH Environment)

The toner was placed in a commercially available nonmagnetic single-component development type printer (printing speed of 18 sheets (A4 sheets) per minute), allowed to stand a day and night at an environment of a temperature of 23° C. and a humidity of 50% (NN environment), then used for continuous printing at the same NN environment by a 5% print density. The fogging was measured for every 1,000 sheets. The number of sheets after which fogging became 1% or more was used as the "number of sheets after which fogging occurs in an NN environment". The print durability test was run up to 13,000 sheets. When fogging occurred in the middle of this, the print durability test was stopped. Note that in the test results, ">13,000 sheets" indicates that the standard is met even if continuously printing 13,000 sheets.

The fogging was measured as follows. First, a white background was printed on. In the middle of this, the printer was stopped, the toner at the nonimage parts on the developed photosensitive body was stripped off by adhesive tape (made by Sumitomo 3M, product name: Scotch Mending Tape™810-3-18), then this was adhered to a new printing sheet. The locations where the toner of the nonimage parts were deposited were measured for color hue by a spectrocolorimeter (Nippon Denshoku, model name: SE-2000). Similarly as a reference, unused adhesive tape was adhered to the printing sheet and similarly measured for color hue. The color hues were expressed as coordinates in an L*a*b* space and the color difference ΔE was calculated from the measured sample and reference sample to find the fogging. The smaller the fogging value, the less fogging and the better the image quality indicated. A similar print durability test was conducted at an environment of a temperature of 28° C. and a humidity of 80% (HH environment) to obtain the number of sheets after which fogging occurred in an HH environment.

Example 1-1

A polymerizable monomer comprised of 75 parts of styrene and 25 parts of n-butyl acrylate (calculated Tg of obtained copolymer=60° C.), 5 parts of copper phthalocyanine as a colorant, 1 part of a charge control agent (styrene/acrylic resin, made by Fujikura Kasei, product name "FCA-207P"), 0.5 part of divinyl benzene as a cross-linkable polymerizable monomer, 1 part of t-dodecyl mercaptan as a molecular weight modifier, and 0.25 part of a polymethacrylic acid ester macromonomer (made by Toagosei Chemical Industry, product name "AA6", Tg=94° C.) were stirred by a stirrer, then uniformly dispersed by a media type disperser. To this, 5 parts of dipentaerythritol hexamyristate (solubility with respect to styrene of 10 g/100 g or more, endothermic peak of 65° C., molecular weight of 1514) as a parting agent was added, mixed, and dissolved to obtain the polymerizable monomer composition. The polymerizable monomer composition was prepared completely at room temperature. On the other hand, at room temperature, an aqueous solution of 50 parts of ion exchanged water into which 4.8 parts of sodium hydroxide (hydroxide alkali metal) was dissolved was gradually added while stirring to an aqueous solution of 250 parts of ion exchanged water into which 8.6 parts of magnesium chloride (water-soluble polyhydric metal salt) was dissolved so as to prepare a magnesium hydroxide colloid (water-insoluble metal hydroxide colloid) dispersion. This dispersion was prepared completely at room temperature. The particle size distribution of said colloid was measured by a particle size measuring apparatus (made by Shimazu Seisakusho, product name: SALD™), whereupon the particle size was 0.36 μm by D50 (50% cumulative value by number particle size distribution) and was 0.80 μm by D90 (90% cumulative value by number particle size distribution).

Said polymerizable monomer composition was charged into the thus obtained magnesium hydroxide colloid dispersion and stirred. To this, 4.4 parts of t-butylperoxy-2-ethylbutanoate (peroxyester of formula 1, where R is 1-ethylpropyl and R' is t-butyl, made by Akzo Nobel, product name "Torigonox™ 27", purity 98%, molecular weight 188, one hour half-life temperature 94° C., 10 hour half-life temperature 75° C.) was added as a polymerization initiator, then a product name: TK Homomixer™ (made by Tokushu Kika Kogyo) was used to stir this by a speed of 12,000 rpm with a high shear force to form droplets of the polymerizable monomer composition.

Next, the aqueous dispersion of the polymerizable monomer composition forming the droplets was inserted from the top of the reactor and raised in temperature to 90° C. for the polymerization reaction. When the polymerization conversion reached 95%, the temperature inside the reactor was held at 90° C. and 1 part of methyl methacrylate as a shell polymerizable monomer and 0.1 part of 2,2'-azobis(2-methyl-N-(2-hydroxyethyl)-propionamide) as an aqueous initiator dissolved in 10 parts of ion exchanged water were added. The temperature was further held at 90° C. for 3 hours to continue the polymerization, then the mixture was water cooled to stop the reaction and obtain a slurry of colored polymer particles.

This slurry was stirred and washed by sulfuric acid to a pH of 6.5 or less, filtered to separate the water, then again given 500 parts of ion exchanged water to form the slurry again and wash it with water. After this, the dewatering and washing were repeated several times at room temperature. The solids were separated by filtration, then placed in a container of a vacuum drier and vacuum dried at a pressure of 30 Torr and a temperature 50° C. a day and night for 72 hr.

The obtained colored polymer particles had a volume average particle size Dv of 9.5 μm and a volume average particle size/number average particle size Dv/Dp of 1.16. Further, the obtained colored polymer particles had a shell thickness, calculated from the amount of the shell monomer and the core particle size, of 0.03 μm. The average circularity was 0.98, and the glass transition temperature measured by DSC was 63° C.

To 100 parts of the above obtained colored polymer particles, 0.8 part of hydrophobized silica particles (average primary particle size 7 nm) and 1.0 part of hydrophobized silica particles (BET specific surface area 50 m$^2$/g) were added. The mixture was mixed using a Henschel mixer to prepare a nonmagnetic single-component polymerization toner. The obtained evaluation results are shown in Table 1.

Example 1-2

Except for using, as the polymerization initiator, t-hexylperoxy pivalate (made by NOF Corporation, product name "Perhexyl™ pV", purity 91%, molecular weight 202, one hour half-life temperature 71° C., 10 hour half-life temperature 53° C.) in 5 parts, the same procedure was performed as in Example 1-1 to prepare a polymerized toner. The test results are shown in Table 1.

Comparative Example 1-1

Except for using, as the polymerization initiator, t-hexylperoxy pivalate (Example 1-2 polymerization initiator diluted by isoparaffin, purity 70%, molecular weight 202, one hour half-life temperature 71° C., 10 hour half-life temperature 53° C.) in 5.7 parts, the same procedure was performed as in Example 1-1 to prepare a polymerized toner. The test results are shown in Table 1.

Comparative Example 1-2

Except for using, as the polymerization initiator, t-butylperoxy-2-ethyl butanoate (Example 1-1 polymerization initiator diluted by isoparaffin, purity 70%, molecular weight 188, one hour half-life temperature 94° C., 10 hour half-life temperature 75° C.) in 6.1 parts, the same procedure was performed as in Example 1-1 to prepare a polymerized toner. The test results are shown in Table 1.

Comparative Example 1-3

Except for using, as the polymerization initiator, t-butylperoxy-2-ethylhexanoate (made by NOF Corporation, product name "Perbutyl™ O", purity 98%, molecular weight 216, one hour half-life temperature 92° C., 10 hour half-life temperature 72° C.) in 5 parts, the same procedure was performed as in Example 1-1 to prepare a polymerized toner. The test results are shown in Table 1.

Comparative Example 1-4

Except for using, as the polymerization initiator, 1,1,3,3-tetramethylbutylperoxy-2-ethylhexanoate (made by NOF Corporation, product name "Peroct™ O", purity 90%, molecular weight 272, one hour half-life temperature 84° C., 10 hour half-life temperature 65° C.) in 6.8 parts, the same procedure was performed as in Example 1-1 to prepare a polymerized toner. The test results are shown in Table 1.

2. Example 2

The test methods used in Example 2 were as follows:
(1) Particle Size

The volume average particle size Dv, number average particle size Dp, and ratio Dv/Dp between the volume average particle size and the number average particle size showing the distribution of particle size were measured using a particle size measuring device the same as in the above Example 1 under the same conditions.

(2) Measurement of Contents of Styrene and Ether Component 3 g of the toner was precisely weighed down to 1 mg units. To the 3 g of the toner, 27 g of ethyl acetate was added. The mixture was stirred for 15 minutes, then 13 g of methanol was added and the mixture was stirred a further 10 minutes. The thus obtained solution was allowed to stand to cause the insolubles to precipitate. The supernatant of this solution was sampled as a measurement sample. 2 μl was injected into a gas chromatograph to assay the styrene and ether components. The measurement conditions by the gas chromatograph were a column of product name: DB-5, made by Agilent, 0.25 mm×30 m, holding the column temperature at 40° C. for 3 minutes, then raising the temperature to 130° C. by 10° C./min, further raising the temperature to 230° C. by 20° C./min and making the injection temperature 200° C. and the FID detection temperature 250° C. As the standard sample for assay, acetic ether/methanol solution, is used.

(3) Evaluation of High Temperature Shelf Stability 20 g of the toner was placed in a container. The container was sealed, then the container was immersed in a constant temperature water tank with a temperature of 60° C. After 5 hours, it was taken out. The toner was transferred from the removed container to a 42 mesh sieve in a manner preventing vibration as much as possible, then was set in a powder measurement apparatus (made by Hosokawa Micron, model name: PowderTester™). The sieve was set to an amplitude of 1.0 mm and vibrated for 30 seconds, then the weight of the toner remaining on the sieve was measured. This was used as the weight of the agglomerated toner. The high temperature shelf stability (%) of the toner was calculated from the ratio (wt %) of the weight of the toner remaining on the sieve (corresponding to weight of agglomerated toner) with respect to the measured weight of the toner (20 g). The smaller the value of the high temperature shelf stability (%) of the toner,

TABLE 1

| | Polymerization initiator | | | | Toner | | | |
| | | | | | Shelf | | Print durability test | |
| | Chemical name | Mol. weight | Am't added (parts) | Purity (%) | stability evaluation | Odor evaluation | NN environment fogging sheets | HH environment fogging sheets |
|---|---|---|---|---|---|---|---|---|
| Ex. 1-1 | t-butylperoxy diethyl acetate | 188 | 4.4 | 98 | A | A | >13,000 | >13,000 |
| Ex. 1-2 | t-hexylperoxy pivalate | 202 | 5 | 91 | A | A | >13,000 | 11,000 |
| Comp. Ex. 1-1 | t-hexylperoxy pivalate | 202 | 5.7 | 70 | B | C | 9,000 | 6,000 |
| Comp. Ex. 1-2 | t-butylperoxy diethyl acetate | 188 | 6.1 | 70 | C | B | 10,000 | 7,000 |
| Comp. Ex. 1-3 | t-butylperoxy-2-ethyl hexanoate | 216 | 5 | 98 | B | C | 9,000 | 7,000 |
| Comp. Ex. 1-4 | 1,1,3,3-tetramethylbutylperoxy-2-ethyl hexanoate | 272 | 6.8 | 90 | C | C | 8,000 | 5,000 | the less the agglomerated toner and the better the high temperature shelf stability indicated.

(4) Evaluation of Odor

The odor was evaluated by a method similar to Example 1.

(5) Print Durability Test (Number of Sheets After Which Fogging Occurred in NN Environment and Number of Sheets After Which Fogging Occurred in HH Environment)

The test was performed by a method similar to Example 1.

Example 2-1

A monovinyl monomer comprised of 75 parts of styrene and 25 parts of n-butyl acrylate (calculated Tg of obtained copolymer=44° C.), 5 parts of a copper phthalocyanine pigment (C.I. Pigment Blue 15:3), 1 part of a charge control agent (styrene/acrylic resin, made by Fujikura Kasei, product name "FCA-207P"), and 0.25 part of a polymethacrylic acid ester macromonomer (made by Toagosei Chemical Industry, product name "AA6", Tg=94° C.) were stirred and mixed in an stirrer, then were uniformly dispersed by a media type disperser. Here, as a parting agent, 5 parts of dipentaerythritol hexamyristate (solubility with respect to styrene of 10 g/100 g or more, endothermic peak of 65° C., molecular weight of 1514) were added, mixed, and dissolved to obtain a polymerizable monomer composition.

On the other hand, to an aqueous solution comprised of 250 parts of ion exchanged water to which 8.6 parts of magnesium chloride (water-soluble polyhydric metal salt) were dissolved, an aqueous solution comprised of 50 parts of ion exchanged water to which 4.8 parts of sodium hydroxide (alkali metal hydroxide) was dissolved was gradually added while stirring to prepare a magnesium hydroxide colloid (water-insoluble metal hydroxide colloid) dispersion. The distribution of particle size of said colloid was measured by a particle size distribution measuring apparatus (made by Shimadzu Seisakusho, product name: SALD™), whereupon the particle was 0.36 µm by D50 (50% cumulative value by number particle size distribution) and was 0.80 µm by D90 (90% cumulative value by number particle size distribution).

The polymerizable monomer composition was charged into the thus obtained magnesium hydroxide colloid dispersion at room temperature. This was stirred until the droplets stabilized. Into this, 5 parts of t-butylperoxy-2-ethylbutanoate (formula 1, where R is 1-ethylpropyl, R' is a t-butyl structure peroxyester, made by Akzo-Nobel, product name "Torigonox™ 27", purity 98%, molecular weight 188, one hour half-life temperature 94° C., 10 hour half-life temperature 75° C.) as a polymerization initiator, 1.2 parts of t-dodecyl mercaptan as a molecular weight modifier, and 0.5 part of divinylbenzene as a cross-linking agent were added, then an in-line emulsion disperser (made by Ebara Corporation, product name "Ebara Milder™") was used to stir this at a speed of 15,000 rpm for 10 minutes with a high shear force to form droplets of the polymerizable monomer composition.

Next, the aqueous dispersion of the polymerizable monomer composition forming the droplets was inserted from the top of the reactor. The aqueous dispersion of the polymerizable monomer composition inside the reactor was raised in temperature to 90° C. to perform the polymerization reaction. When the polymerization conversion reached 95%, 1 part of methyl methacrylate as a shell polymerizable monomer and 0.1 part of an aqueous initiator (made by Wako Pure Chemicals, product name: VA086) dissolved in 10 parts of ion exchanged water were added. The polymerization was continued for 3 hours, then the reaction was stopped to obtain an aqueous dispersion of colored polymer particles with a pH 9.5.

Further, the aqueous dispersion of the obtained colored polymer particles was, as a stripping process, stripped by the method of blowing in a gas in the system shown in FIG. 1 in the following way.

First, an aqueous dispersion of the colored polymer particles was diluted by ion exchanged water to a solid concentration of 20%, then was fed into the evaporator 1. Next, 0.1 part of a defoamer (made by San Nopco Ltd., product name "SN Defoamer™ 180) was added to the evaporator 1. Nitrogen gas was run through the evaporator 1 to replace the gas phase part inside the evaporator with nitrogen gas. Next, the aqueous dispersion of the colored polymer particles was stirred by the stirring blades 3 while heating to 80° C., then the blower 6 was started up to adjust the flow rate of the nitrogen gas to 0.6 m$^3$/(hr·kg) and blow nitrogen gas into the aqueous dispersion of the colored polymer particles from a gas blowing pipe 5 having a straight pipe shaped gas blowing port and thereby remove the volatile matter from the colored polymer particles.

The stripped nitrogen gas was passed through the gas circulating line 7 and led to the condenser 8 and condensation tank 9. The condensed nitrogen gas was passed through the gas circulating line 10 and led to the volatile matter removing apparatus (adsorption tower packed with activated charcoal) 11. There, the volatile matter contained in the nitrogen gas was removed. The nitrogen gas stripped of the volatile matter was passed through the gas circulating line 12, was passed from the blower 6 to the gas blowing pipe 13, and was again blown into the evaporator 1.

The stripping was performed by treatment of an aqueous dispersion of the colored polymer particles at a temperature of 80° C., a pressure inside the evaporator 1 of 101 kPa, and a nitrogen gas flow rate of 0.6 m$^3$/(hr·kg) for 6 hours. After six hours of treatment, the aqueous dispersion of the colored polymer particles was cooled to room temperature.

After this, the aqueous dispersion of the obtained colored polymer particles was stirred at room temperature, sulfuric acid was added to make the pH 6.5 or less for acid washing, the water was separated by filtration, then 500 parts of ion exchanged water were again added to make a slurry in the water washing side. After this, the particles were repeatedly dewatered and washed by water for filtration, then were placed inside a container of the vacuum drier and vacuum dried day and night at a pressure of 30 Torr and a temperature of 50° C.

The colored polymer particles obtained due to the drying had a volume average particle size Dv of 9.5 µm and a volume average particle size Dv/number average particle size Dp of 1.16. Further, the thickness of the shell calculated from the amount of the shell polymerizable monomer and the particle size of the core particles (colored polymer particles) before forming the shell was 0.03 µm and its sphericity was Sc/Sr=1.2.

To 100 parts of the above obtained colored polymer particles, 0.8 part of hydrophobized silica particles (made by Cabot, product name: TG820F) and 1.0 part of hydrophobized silica particles (made by Aerosil Japan, product name: NA50Y) were added. The mixture was mixed using a Henschel mixer to prepare a nonmagnetic single-component polymerization toner. The obtained evaluation results are shown in Table 2.

Example 2-2

Except for using, as the polymerization initiator, t-butylperoxy-2-ethylhexanoate (made by NOF Corporation, product name "Perbutyl™ O", purity 97%, molecular weight 216, one hour half-life temperature 92° C., 10 hour half-life temperature 72° C.) in 5 parts, making the stripping temperature 85° C., and making the stripping time 10 hours, the same procedure was performed as in Example 2-1 to prepare a toner. The evaluation results are shown in Table 2.

Comparative Example 2-1

Except for using, as the polymerization initiator, t-butylperoxy-2-ethylhexanoate (made by NOF Corporation, product name "Perbutyl™ O", purity 97%, molecular weight 216, one hour half-life temperature 92° C., 10 hour half-life temperature 72° C.) in 6 parts, the same procedure was performed as in Example 2-1 to prepare a toner. The evaluation results are shown in Table 2.

Comparative Example 2-2

Except for using, as the polymerization initiator, 1,1,3,3-tetramethylbutylperoxy-2-ethylhexanoate (made by NOF Corporation, product name "Peroct™ O", purity 90%, molecular weight 272, one hour half-life temperature 84° C., 10 hour half-life temperature 65° C.) in 6 parts, the same procedure was performed as in Example 2-1 to prepare a toner. The evaluation results are shown in Table

Comparative Example 2-3

Except for using, as the polymerization initiator, t-hexylperoxy-2-ethylhexanoate (made by NOF Corporation, product name "Perhexyl™ O", purity 90%, molecular weight 244, one hour half-life temperature 90° C., 10 hour half-life temperature 70° C.) in 6 parts, the same procedure was performed as in Example 2-1 to prepare a toner. The evaluation results are shown in Table 2.

Note that the above embodiments and examples were described for the purpose of facilitating understanding of the present invention and not for limiting the present invention. Therefore, the elements disclosed in the above embodiments and examples include all design changes and equivalents falling in the technical scope of the present invention.

The present disclosure relates to content contained in Japanese Patent Application No. 2005-209303 filed on Jul. 19, 2005, Japanese Patent Application No. 2005-209770 filed on Jul. 20, 2005, and Japanese Patent Application No. 2005-287809 filed on Sep. 30, 2005, the entire disclosures of which are incorporated here by reference.

Industrial Applicability

The toner obtained by the present invention can be used as a developer for electrostatic image development in a facsimile, copier, printer, or other image forming apparatus using the electrophotographic process.

The invention claimed is:

1. A process of production of a toner containing colored polymer particles obtained by polymerizing a polymerizable monomer composition containing a polymerizable monomer and colorant in an aqueous medium in the presence of a polymerization initiator, wherein
    said polymerization initiator is an organic peroxide,
    said organic peroxide has a molecular weight of 205 or less,
    said organic peroxide has a purity of 90% or more, and
    said organic peroxide is a peroxyester expressed by the following formula 1:

[Chemical formula 1]

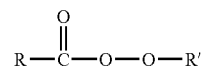

where R in said formula 1 is a C5 or less alkyl group, the R in said formula 1 is a secondary alkyl group, and R' in formula 1 is any alkyl groups.

2. A process of production of a toner as set forth in claim 1, wherein said organic peroxide has a one hour half-life temperature of 70° C. to 95° C.

TABLE 2

| | Polymerizable monomer | | Polymerization initiator | | Stripping step | | Toner | | | Print test | | |
|---|---|---|---|---|---|---|---|---|---|---|---|---|
| | Styrene (parts) | N-butyl acrylate (parts) | Compound name | Am't add. (parts) | Temp. (° C.) | Time (h) | Ether component (ppm) | Styrene (ppm) | High Temp. Shelf stability (%) | NN durable sheets (K) | HH durable sheets (K) | Odor |
| Ex. 2-1 | 75 | 25 | t-butylperoxy-2-ethyl butanoate | 5 | 80 | 6 | 22 | 15 | 1.1 | 13 | 12 | A |
| Ex. 2-2 | 75 | 25 | t-butylperoxy-2-ethyl hexanoate | 5 | 85 | 10 | 320 | 12 | 1.1 | 12 | 10 | B |
| Comp. Ex. 2-1 | 75 | 25 | t-butylperoxy-2-ethyl hexanoate | 6 | 80 | 6 | 4,100 | 21 | 21.5 | 9 | 6 | C |
| Comp. Ex. 2-2 | 75 | 25 | 1,1,3,3-tetramethylbutyl peroxy-2-ethyl hexanoate | 6 | 80 | 6 | 2,700 | 111 | 14.6 | 9 | 5 | C |
| Comp. Ex. 2-3 | 75 | 25 | t-hexylperoxy-2-ethyl hexanoate | 6 | 80 | 6 | 2,500 | 54 | 11.5 | 8 | 5 | C |

* * * * *